US006875993B2

(12) United States Patent
Tatum et al.

(10) Patent No.: US 6,875,993 B2
(45) Date of Patent: Apr. 5, 2005

(54) SYSTEMS AND METHODS FOR OPTICALLY DETECTING AND IDENTIFYING OBJECTS IN AN ENVIRONMENT

(75) Inventors: Jimmy A. Tatum, Plano, TX (US); James K. Guenter, Garland, TX (US)

(73) Assignee: Honeywell International Inc., Morristown, NJ (US)

( * ) Notice: Subject to any disclaimer, the term of this patent is extended or adjusted under 35 U.S.C. 154(b) by 197 days.

(21) Appl. No.: 09/834,220

(22) Filed: Apr. 12, 2001

(65) Prior Publication Data

US 2002/0148982 A1 Oct. 17, 2002

(51) Int. Cl.[7] .............................................. G01N 21/86
(52) U.S. Cl. ............................. 250/559.2; 250/559.4; 356/4.03; 356/614; 356/625
(58) Field of Search ........................... 250/559.2, 559.4, 250/221, 222.1, 559.21, 559.12; 340/555, 556, 557; 356/4.01, 4.03, 4.08, 614, 625, 627, 634, 635

(56) References Cited

U.S. PATENT DOCUMENTS

| | | |
|---|---|---|
| 4,037,157 A | 7/1977 | Campbell |
| 4,179,685 A | 12/1979 | O'Maley |
| 4,221,963 A | 9/1980 | Fushimi |
| 4,459,487 A * | 7/1984 | Leser ..................... 250/559.22 |
| 4,509,075 A | 4/1985 | Simms et al. |
| 4,900,913 A | 2/1990 | Muro |
| 5,166,741 A | 11/1992 | Gempe et al. |
| 5,266,810 A | 11/1993 | Murphy |
| 5,382,785 A * | 1/1995 | Rink ........................... 250/205 |
| 5,635,724 A | 6/1997 | Higgins |
| 5,793,485 A | 8/1998 | Gourley |
| 5,835,613 A | 11/1998 | Breed et al. |
| 5,866,915 A * | 2/1999 | Pryor et al. .............. 250/559.2 |
| 6,091,504 A * | 7/2000 | Walker et al. ............... 356/437 |
| 6,115,111 A | 9/2000 | Korah et al. |
| 6,203,985 B1 | 3/2001 | Jiang et al. |
| 6,288,644 B1 * | 9/2001 | Mathews et al. ........... 340/555 |
| 6,313,460 B1 * | 11/2001 | Haas et al. ............. 250/231.13 |
| 6,316,763 B1 * | 11/2001 | Appleyard et al. ......... 250/221 |
| 6,353,502 B1 | 3/2002 | Marchant et al. |

FOREIGN PATENT DOCUMENTS

| | | |
|---|---|---|
| DE | 44 04 483 A1 | 8/1995 |
| WO | WO 88 00745 A | 1/1988 |

OTHER PUBLICATIONS

Patent Cooperation Treaty, International Search Report, Aug. 5, 2002, for PCT counterpart PCT/US 02/11464 of this US patent application.

* cited by examiner

*Primary Examiner*—Stephone B. Allen
(74) *Attorney, Agent, or Firm*—Andrew A. Abeyta; Ortiz & Lopez, PLLC

(57) ABSTRACT

Laser optical sensing systems and methods for detecting object characteristics are disclosed. The system includes a laser source with at least two emission apertures from which laser signals are emitted. The system also includes at least one detector, which is operationally responsive to the laser source. The system can also include a microprocessor that is operationally coupled to the detector(s) for processing signal data, a memory accessible by the microprocessor for storing object characteristics (e.g., unique signals), and a software module accessible by the microprocessor for enabling system training and detection operations. The laser source emits into an environment at least two laser signals, one from each emission aperture. The detector detects the laser signals after the signals pass through the environment, which is occupied by an object, and the microprocessor determines object characteristics based on the matching of laser signals received by the detector(s) and characteristics stored in memory.

16 Claims, 11 Drawing Sheets

SYSTEMS AND METHODS FOR OPTICALLY DETECTING AND IDENTIFYING OBJECTS IN AN ENVIRONMENT

RELATED CO-PENDING APPLICATIONS

The present invention is related to the following co-pending patent applications: Ser. No. 09/724,819 entitled "Multiple Laser Optical Sensing Systems and Methods," filed Nov. 28, 2000; Ser. No. 09/834,242 entitled "Trainable Laser Optical Sensing Systems and Methods," filed Apr. 12, 2001; and Ser. No. 09/834,243 entitled "Motion Sensing Systems and Methods," filed Apr. 12, 2001; and Ser. No. 09/834,244 entitled "laser Optical Area Scanner and Response System," filed Apr. 12, 2001.

BACKGROUND OF THE INVENTION

Previous approaches to addressing sensing needs have generally involved using a single light signal from a light source, such as a light emitting diode, and multiple detectors. In order to illuminate a large area in an environment using a single light source, two general methods are known. One approach typically involves emitting a broad light signal from the light source and detecting the signal with one of multiple detectors positioned throughout the environment. The other approach typically involves emitting a narrow light signal from the light source, spreading the signal around the environment by reflecting it off of a rotating mirror, for instance, and detecting the signal with one of multiple detectors positioned throughout the environment. While feasible, both approaches typically require multiple detectors and are usually not power efficient as a result, yielding a low signal-to-noise ratio. A poor power-transfer ratio reflects this inefficiency as the individual detector that receives a light signal usually detects only a portion of the signal that was originally emitted. Consequently, the signal that was detected generally provides only limited information about an object being sensed in the environment. These approaches also tend to limit the size range of the object being sensed in an environment due to the nature of the single light signal.

The limitations of these previous approaches are often manifested in applications such as detecting the motion of an object in an environment. Many motion detection systems generally involve a line-of-sight operation, where at least one detector detects the motion of an object as the object breaks a beam of light emitted from a light source. In relatively simple applications, such as determining the presence or absence of an object, this approach generally suffices. For more complex applications, such as determining the direction of the object's motion, this approach proves less adequate. When an object moves across a single light signal emitted by a light source, the signal received by a detector gradually decreases as the signal blocked by the object gradually increases. This gradual change in signal detection typically requires a complex algorithm to determine the position of the object in the environment. Adding multiple detectors can provide more information and decrease the complexity of the algorithm required, though this introduces power inefficiencies as mentioned previously, as well as adding costs associated with additional hardware.

The limitations of the aforementioned approaches also relate to applications involving object recognition. Many known systems, either for recognizing only specific objects or for mapping spatial characteristics of objects, involve spreading a light signal with a rotating mirror and/or using multiple detectors. Holograms can also be used to spread the light signal by dividing the signal into smaller light signals. An approach for detecting only specific objects involves emitting pulses of signals from a transceiver, receiving the signals that reflect off of an object, and comparing the received signals with preset signals reflected off of known objects. Information about the known objects is typically stored in a database. An approach for mapping an object involves superimposing light signals received by different detectors in the presence of an object and comparing the signals with respect to signals associated with the environment without the object.

While each of these approaches is feasible for a particular function, none is known to perform several functions. This deficit creates a need for a versatile system that is both power efficient and cost effective. Such a system could be capable of, for instance, detecting the presence or absence of any object or of a specific object, detecting the spatial characteristics of an object, detecting the motion of any object or a specific object, or detecting various characteristics about the motion of an object.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

An aspect of the present invention includes a multiple laser optical sensing system for detecting object characteristics using a vertical cavity surface emitting laser. The system can include a vertical cavity surface emitting laser structure with at least two emission apertures that could be defined by photolithography. A laser signal can be emitted into an environment from each of the emission apertures. The system can also include at least one detector that is operationally responsive to the vertical cavity surface emitting laser structure. Finally, the system can include a microprocessor that is operationally coupled to the detector(s). In operation, the vertical cavity surface emitting laser structure can emit at least two laser signals into the environment, which may be occupied by an object. At least one detector detects the laser signals once they have passed through the environment. The microprocessor can then determine object characteristics based on laser signals received by the detector(s). Within the same vertical cavity surface emitting laser structure, the laser signals emitted can be identical or not identical. Optics can also be added to the system, such that laser signals pass through at least one lens or reflect off of a mirror or mirrors after exiting the emission apertures.

An aspect of the present invention provides methods for detecting object characteristics transmissively or reflectively using a vertical cavity surface emitting laser. In a transmissive method, a vertical cavity surface emitting laser structure can statically emit at least two laser signals into an environment, which may be occupied by an object. The object can block at least one of the laser signals passing through the environment, and at least one detector can transmissively receive any of the signals not blocked by the object. A microprocessor can then determine object characteristics by comparing characteristics of the laser signals emitted by the vertical cavity surface emitting laser structure with characteristics of the signals received by the detector(s).

In a reflective method, a vertical cavity surface emitting laser structure can serially emit at least one laser signal at a time into an environment, which may be occupied by an object. At least one of the laser signals can reflect off of the object and can be detected by at least one detector. A microprocessor can then determine object characteristics by comparing temporal characteristics of the laser signals emitted by the vertical cavity surface emitting laser structure with temporal characteristics of the signals received by the detector(s).

In any method taught by the present invention, a microprocessor could determine the size or shape of an object by determining which laser signals are received by a detector after different arrays of laser signals are emitted by a vertical cavity surface emitting laser structure. The microprocessor could also detect motion of the object in an environment by detecting changes in the array of laser signals that are blocked or reflected off of the object.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
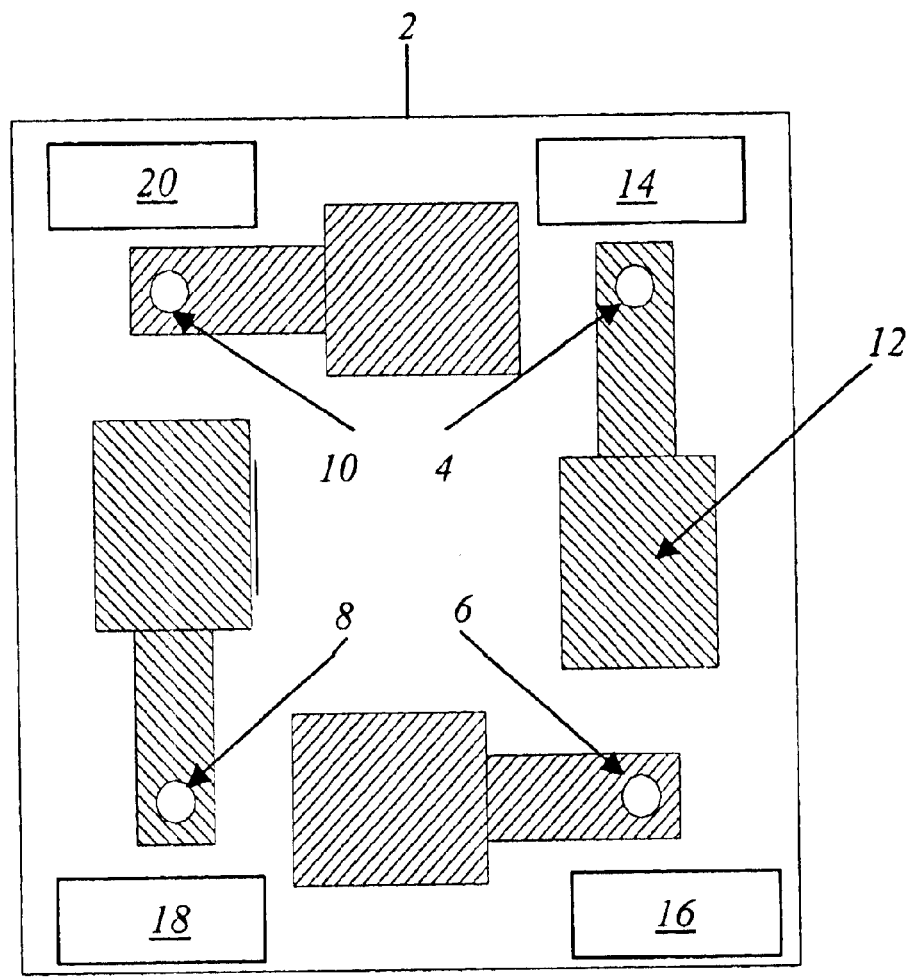
FIG. 1 illustrates a diagram of a vertical cavity surface emitting laser structure.

In the following nonlimiting example of this embodiment, FIG. 1 shows a vertical cavity surface emitting laser (VCSEL) structure 2 with a plurality of emission apertures 4, 6, 8, and 10. Emission apertures 4, 6, 8 and 10 can be fabricated by using either proton isolation or dielectric oxide techniques to provide both carrier and optical confinement. Emission aperture 4, for instance, is functionally integrated (although they do not have to be integrated) with a bond pad 12 and is electrically coupled to an element 14. Elements 16, 18, and 20 are also shown and can be identical or not identical to each other and to element 14. Upon powering elements, emission apertures emit light signals (not shown) perpendicular to VCSEL structure 2, making them especially amenable to the fabrication of both one and two-dimensional arrays. While the example shown in FIG. 1 (and other figures) comprises a 2×2 array of emission apertures, it should be noted that the fabrication of M×N arrays is also feasible and that the 2×2 array is only provided to simplify explanation.

One of the principle advantages to array fabrication using VCSEL structures 2 is that all of the dimensions in the array can be fabricated using photolithography, thereby incorporating high dimensional tolerances in the placement of the emission apertures. As a result, the high dimensional tolerance produces a precisely defined array of light signals emitted and enables the fabrication of any one or two-dimensional array desired, such as the pattern of a cross. The elements can be electrically connected or coupled in virtually any manner desired as well, permitting light signals to be emitted individually or in groups. Light signals can be emitted in single or multiple spatial modes and can vary in terms of divergence angles and/or the diameter of the light signal being emitted and focused. Light signals can also be emitted in single or multiple wavelengths. By using advanced selective epitaxial techniques, light signals of widely separated wavelengths can be fabricated.

Figure 2:
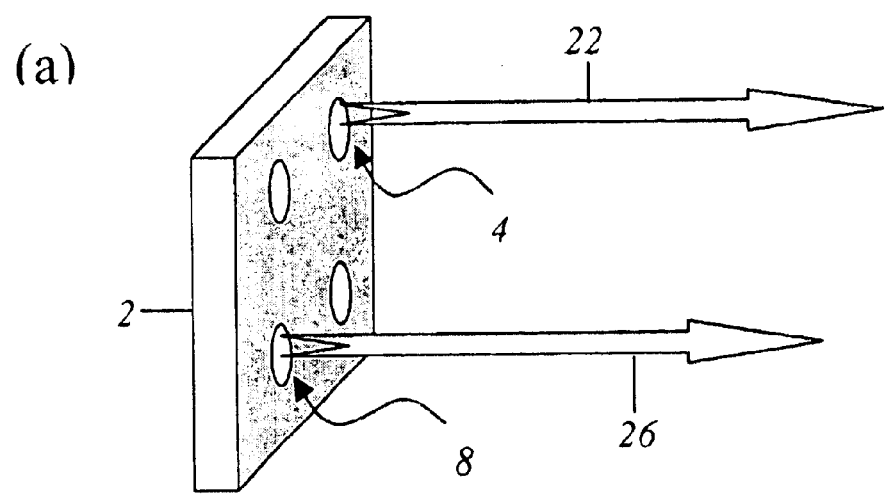
FIG. 2 illustrates diagrams of a vertical cavity surface emitting laser structure emitting two different patterns of light signals 2(a) and 2(b)
Figure 2:
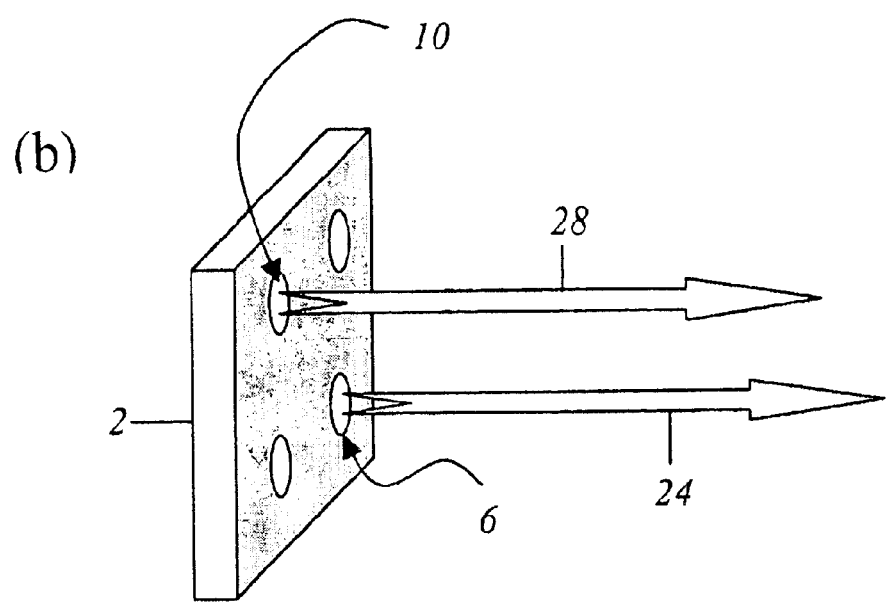

FIG. 2 illustrates the illumination of different patterns of light signals by the same VCSEL structure 2. In FIG. 2(a), emission aperture 4 emits light signal 22 while aperture 8 emits light signal 26. In FIG. 2(b), emission aperture 6 emits light signal 24 while aperture 10 emits light signal 28. Similarly, any other one, or group of two, three, or four, light signals could be emitted from a 2×2 array. It should be reiterated that any array including any number of emission apertures could be constructed, permitting the emission of a variety of light signal patterns.

Figure 3:
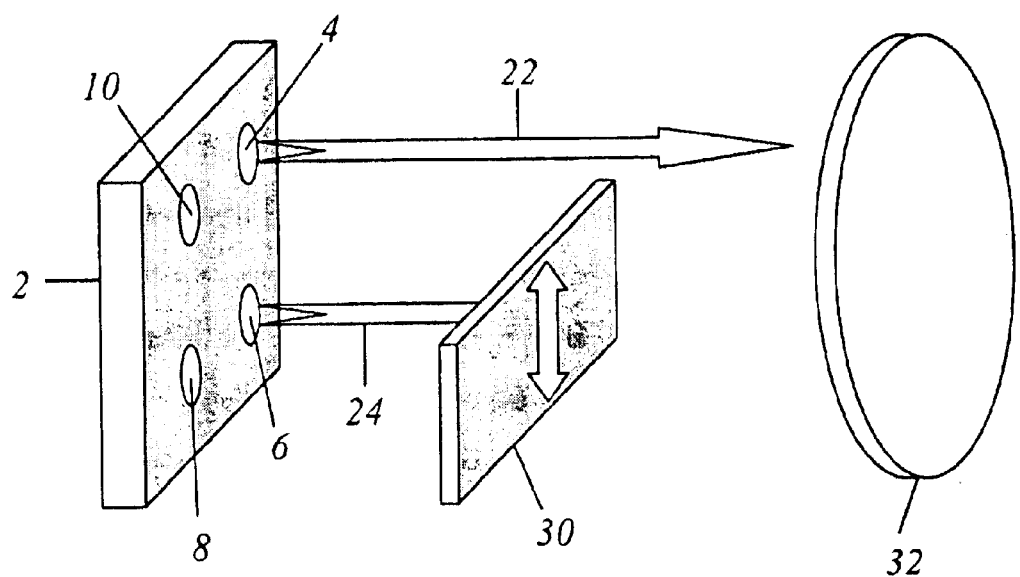
FIG. 3 illustrates a diagram of a target blocking a light signal statically emitted from a vertical cavity surface emitting laser structure before it reaches a detector.

The first preferred embodiment is a reconfigurable static structured light source, which is depicted in FIG. 3. The diagram shows VCSEL structure 2 simultaneously emitting light signals 22 and 24 into an environment from emission apertures 4 and 6, respectively. While different light signals (or sets of signals) of the array can be emitted at different times, the timing of the changes is not directly relevant to the intended function. A target 30 is positioned in the environment between VCSEL structure 2 and a detector 32, which could be any of various types, such as a photodiode. A photodiode detector could either include an individual photodiode, multiple photodiodes individually packaged, or an array of photodiodes on a single structure in a single package.

As target 30 moves upward, the particular light signal received by detector 32 changes from full on (no obstruction), to half on (signal 24 blocked but not signal 22), and finally to full off (both signals 24 and 22 blocked). This happens in an essentially digital, or stepwise, fashion. A single illuminator in a similar geometry would provide only a very gradual change in detector illumination, requiring a more sophisticated algorithm to determine position at the midpoint. However, with this same VCSEL array, the identical function can be provided for target 30 moving orthogonally to that shown in FIG. 3, simply by emitting signals from apertures 6 and 8 instead of 4 and 6, for example. For detection of a diagonally-moving target, signals from apertures 4 and 8 or 6 and 10 would be emitted. Thus, multiple motions could be sensed with a single detector 32 by sequentially emitting light signals from different apertures.

An extension of the concept requires larger element counts. Consider a VCSEL array with 5×2 elements, for example. If a stationary target with a corrugated edge is interposed between the VCSEL array and a detector, the corrugations will block some light signals and not others. By cycling through several fixed patterns of "lit" and "unlit" VCSELs, the detector signal can be interpreted as a map of the corrugated edge. In this way the corrugated obstruction acts as a key and the optical assembly including the VCSEL array and the detector acts as a lock. Electronics known to those skilled in the art can produce locks that recognize only one or several keys. Any emission patterns that correspond in a certain way to the pattern on the target would result in a positive identification, or recognition, by the detector.

Figure 4:
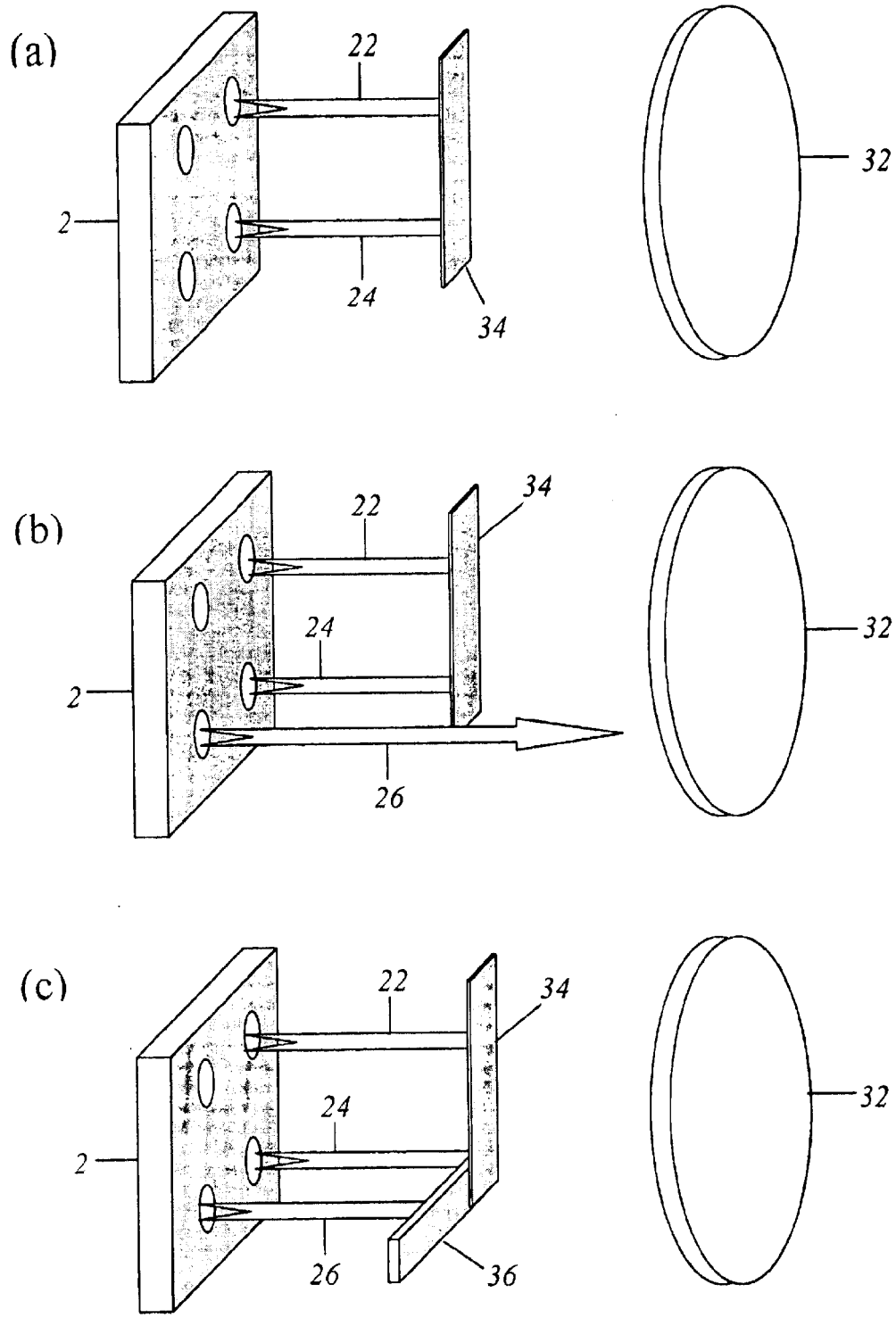
FIG. 4 illustrates diagrams of a vertical cavity surface emitting laser structure cycling through different emission patterns of light signals to determine a map of the target. In 4(a) light signals forming a vertical line are blocked by a vertical bar-shaped target and none reach a detector. When a different pattern of signals is emitted as in 4(b), forming a right angle, one signal reaches the detector. In the presence of a right angle-shaped target as in 4(c), however, the same right angle-shaped pattern as emitted in 4(b) would be blocked.

FIG. 4 illustrates VCSEL structure 2 cycling through different emission patterns of light signals to determine a map of a target. In FIG. 4(a), a vertical bar-shaped target 34 blocks light signals 22 and 24 from reaching detector 32. When a different pattern of signals is emitted (22, 24, and 26) as in (b), signal 26 reaches detector 32 while signals 22 and 24 remain blocked. Detector 32, therefore, recognizes that target 34 has no horizontal piece spatially correlated to light signal 26. In the presence of a right angle-shaped target 36 as in FIG. 4(c), however, the same right angle-shaped pattern as emitted in FIG. 4(b) is blocked. Neither signal 22, 24, nor 26 reaches detector 32, indicating to detector 32 that target 36 (unlike target 34) does have a horizontal piece spatially correlated to light signal 26.

Figure 5:
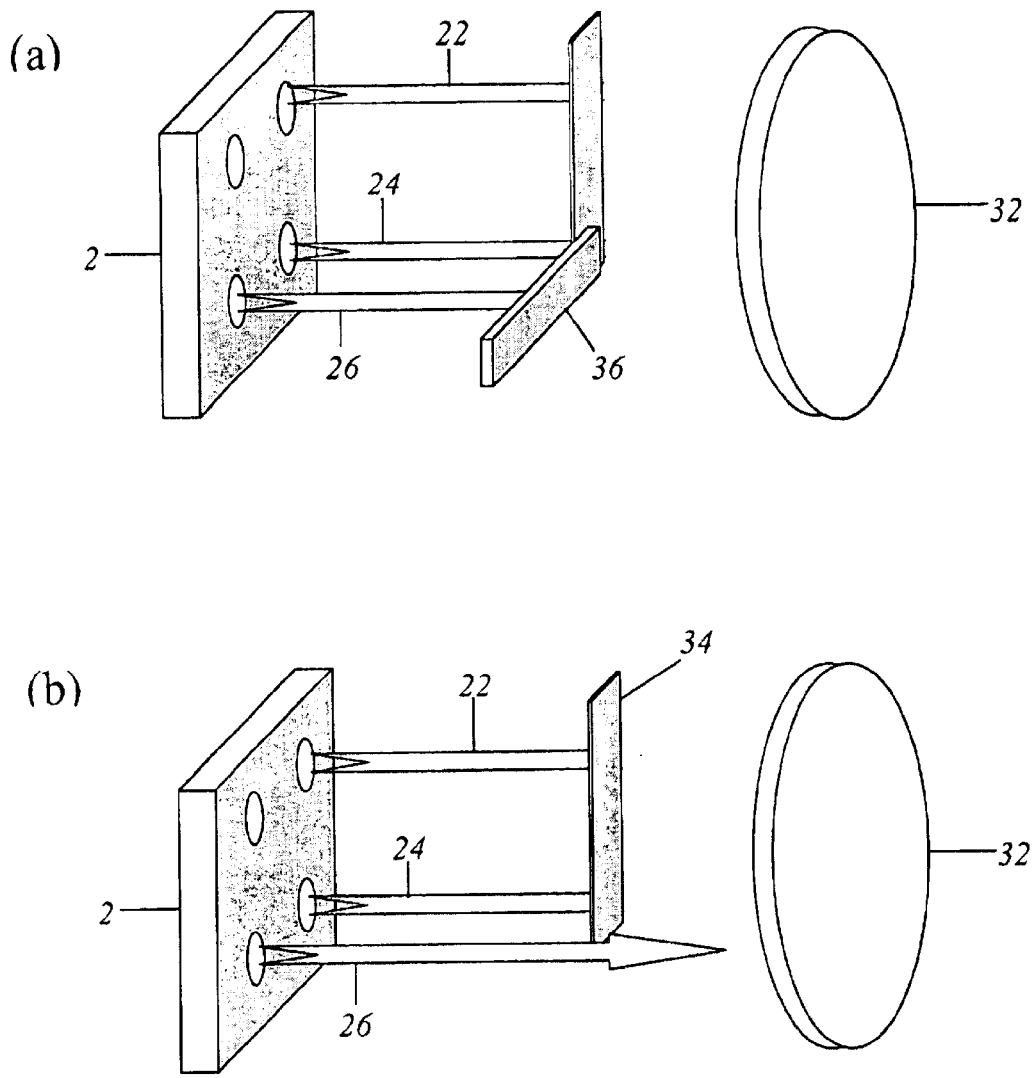
FIG. 5 illustrates diagrams of a vertical cavity surface emitting laser structure emitting the same pattern of light signals in 5(a) and 5(b). In 5(a) a target blocks all emitted signals, whereas in 5(b) a different target does not block all signals, allowing recognition of a specified target only.

FIG. 5 illustrates how a specified target can be recognized while others are not. In this example, VCSEL structure 2 emits the same pattern of light signals in FIGS. 5(a) and (b), though the shape of the target differs. In FIG. 5(a), target 36 blocks all emitted signals 22, 24, and 26 from reaching detector 32. In FIG. 5(b), target 34 blocks only light signals 22 and 24, permitting signal 26 to reach detector 32. With the same pattern of light signals emitted, therefore, different signals will reach detector 32 depending on the shape of the particular target present in the environment. This difference subsequently could allow for recognition of a specified target when an exact "match" is made by the system.

The aforementioned corrugated opaque obstruction is only one example of possible key configurations. Among other possibilities are arrays of holes or exposed areas on film.

In addition to using a plurality of light sources, the present invention could perform object recognition tasks faster than many current systems by using a camera as a detector. The camera could be one of various types, including a charge-coupled device (CCD) or CMOS camera. When the camera display of a typical current system is divided into separate areas, complex image processing algorithms are often required to measure the partially blocked areas from the uniform light source. When the display of the present invention is divided into separate areas, each area has its own independent illumination differing spatially from adjacent illuminations due to the plurality of light signals emitted. As a result, all of the signals can be detected simultaneously and be quickly summed together to provide the desired information.

A target could also be detected by the composition of its surface. The absorptive characteristics of the surface can absorb and/or reflect light signals differently based on the wavelength of the signals. Emitting light signals of different wavelengths, which might be accomplished by fabricating VCSEL structure 2 with different elements, could, therefore, also indicate the absorptive characteristics of the material. In either situation, detecting a target based on its characteristics, or detecting the characteristics of a target, a microprocessor could determine characteristics by comparing the light signals received by a detector with the signals emitted by a VCSEL structure. If the difference in wavelength among the signals emitted were large enough to detect by a detector, a plurality of detectors (such as detector 32 depicted in the figures) could be used to detect signals within different ranges of wavelength, which might provide more detailed information about the absorptive characteristics of most targets. Features can be compared to characteristics stored in memory.

In order to detect targets of various sizes, optics could be added. A lens or array of lenses can be positioned between VCSEL structure 2 and target 30 such that the lens reproduces the pattern of emitted light signals into a larger or smaller pattern in the image plane. The emission pattern of the image would be identical in shape to the original pattern emitted but different in size. A microprocessor could then correlate the pattern of light signals received by detector 32 in the presence of target 30 with the pattern of signals originally emitted and/or with signals stored in memory.

Figure 6:
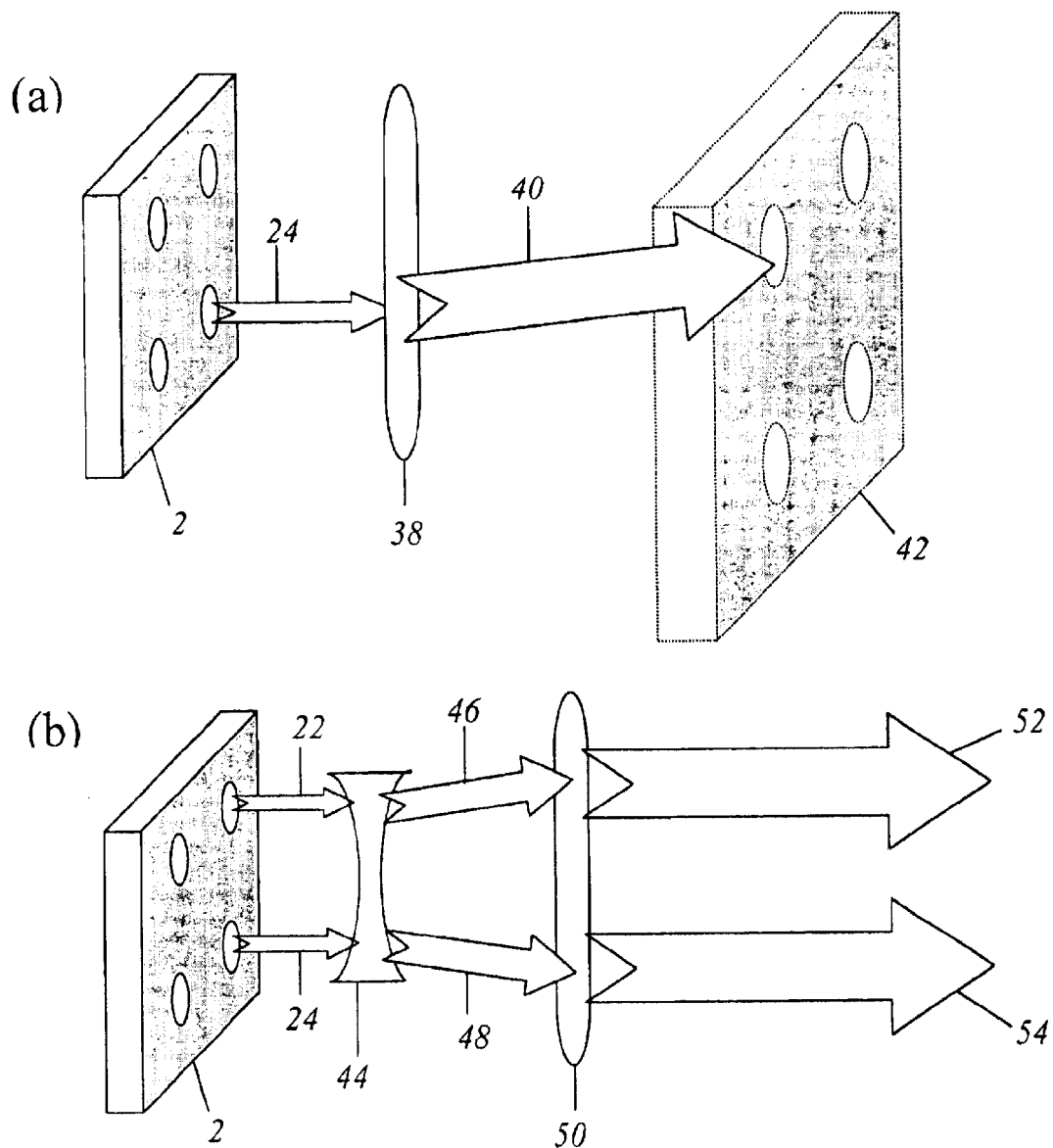
FIG. 6 illustrates diagrams of emitted light signals passing through in 6(a) a single lens producing a magnified image of the emitted array and in 6(b) a compound lens system producing an expanded version of the emitted array.

FIG. 6 illustrates two ways in which lenses can be used to alter the size of an array of light signals. In FIG. 6(a), a single lens 38 produces a magnified image 42 of the array emitted by VCSEL structure 2, affording detection of targets larger than the physical array. As light signal 24 enters lens 38, lens 38 magnifies signal 24 into a new light signal 40 having a larger diameter. In this particular configuration, magnified image 42 would be inverted compared to the array originally emitted by VCSEL structure 2. Two lenses could also be used in a collimator-telescope configuration (not shown). In FIG. 6(b) a compound lens system produces an expanded version of the array emitted by VCSEL structure 2. As light signals 22 and 24 enter lens 44, lens 44 manipulates (either through convergence or divergence) signals 22 and 24, creating new light signals 46 and 48, respectively.

Signals 46 and 48 then enter a lens 50, which collimates signals 46 and 48 into new signals 52 and 54, respectively. These resulting signals 52 and 54 have a larger diameter than light signals 22 and 24 originally emitted.

Figure 7:
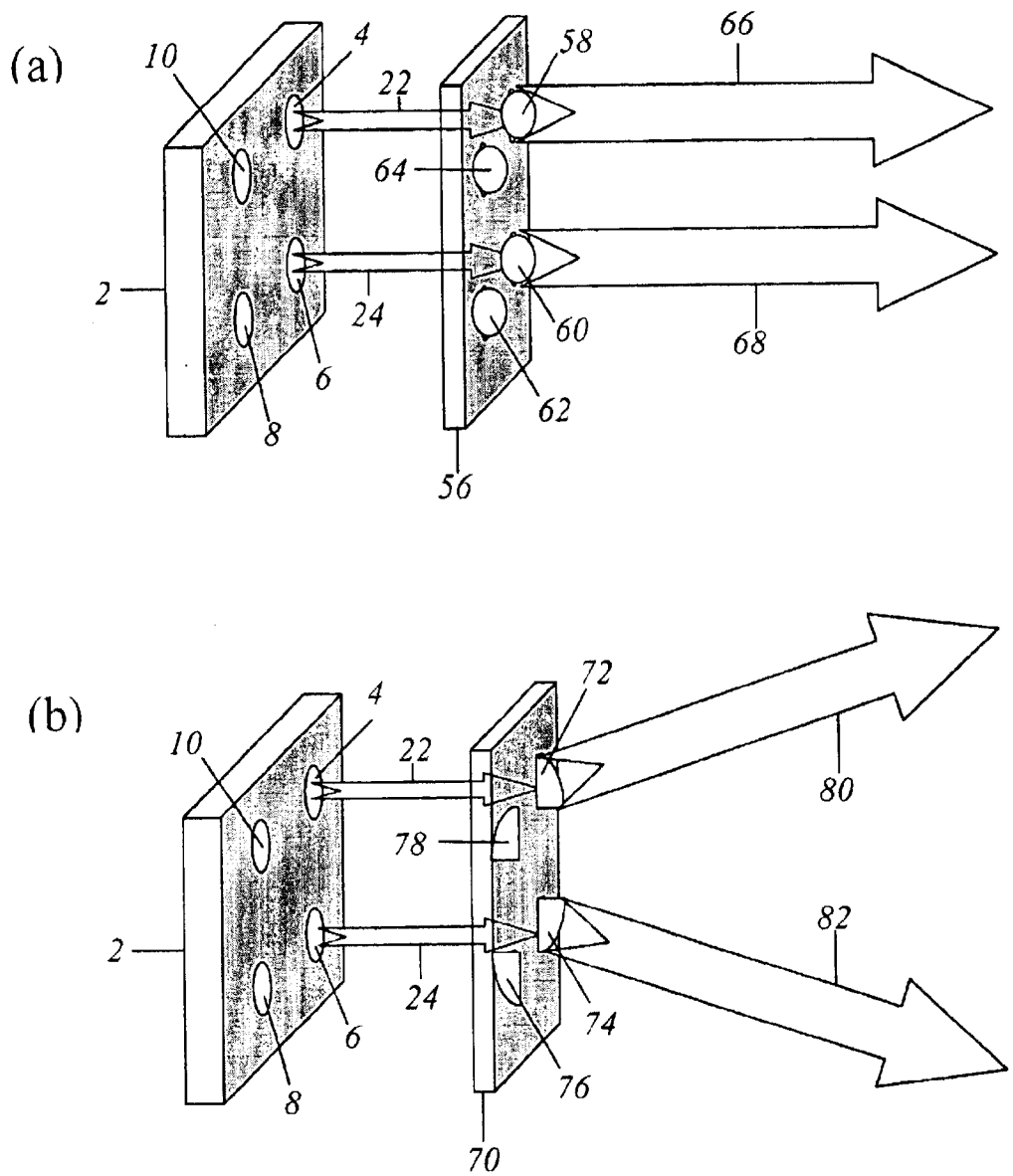
FIG. 7 illustrates diagrams of emitted light signals passing through arrays of lenses. The array of lenses in 7(a) expands the diameter of light signals without changing their center spacing. The array of lenses in 7(b) expands the diameter and changes the direction of emitted light signals.

FIG. 7 illustrates alternative configurations of arrays of lenses that can be used to alter the array of light signals emitted by VCSEL structure 2. In FIG. 7(a) lens array 56 contains lenses 58, 60, 62, and 64 that correspond spatially to emission apertures 4, 6, 8, and 10, respectively. Lens 58 expands the diameter of entering light signal 22 into new light signal 66. Similarly, lens 60 expands the diameter of signal 24 into new signal 68. While the lenses of lens array 56 alter the size of the light signals, they do not alter the center spacing of the signals and thus conserve the spatial characteristics of the array emitted by VCSEL structure 2.

In FIG. 7(b) lens array 70 contains lenses 72, 74, 76, and 78 that correspond spatially to emission apertures 4, 6, 8, and 10, respectively. Lens 72 expands the diameter and changes the direction of entering light signal 22 into new light signal 80. Similarly, lens 74 expands the diameter and changes the direction of signal 24 into new signal 82. In this particular example, lens array 70 diverges entering light signals, though other configurations of divergence or convergence could be used as well.

Figure 8:
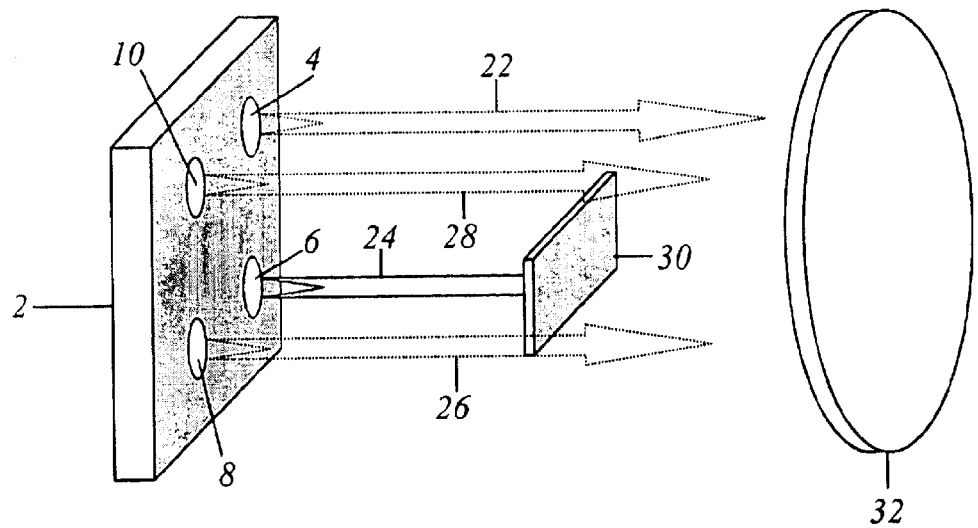
FIG. 8 illustrates a diagram of a target blocking a light signal serially emitted from a vertical cavity surface emitting laser structure before it reaches a detector.

In the second preferred embodiment, the timing of illuminating the individual elements is an integral part of the sensing process. The elements are serially illuminated in a sequence whose temporal characteristics are interpreted. In FIG. 8, VCSEL structure 2 is shown sequentially emitting light signals from emission apertures 4, 6, 8, and 10 in the order 4, 6, 8, 10, 4, 6, 8, 10, etc. Corresponding light signals 22, 24, 26, and 28 are, therefore, emitted from the emission apertures. In this example, three light signals have already been emitted (26, 28, 22), illustrated by the dotted lines, and one is currently lit (24). Light signal 26 has been emitted and has reached detector 32 unobstructed by target 30. Signal 28 was then emitted and similarly reached detector 32 unobstructed. Light signal 22 reached target 30 next, also unobstructed. Currently, signal 24 is lit and has been blocked by target 30 before reaching detector 32. If the output of a single detector 32 disposed to receive all of the light signals in the array is monitored over time, the angular (and to a partial extent, the spatial) location of target 30 can be determined by the absence of a signal at the time the particular signal(s) are blocked. The array need not be circular, as linear arrays or multiple concentric rings could be used to map the shape of target 30 by interpreting the time-sequence of the output of detector 32.

Figure 9:
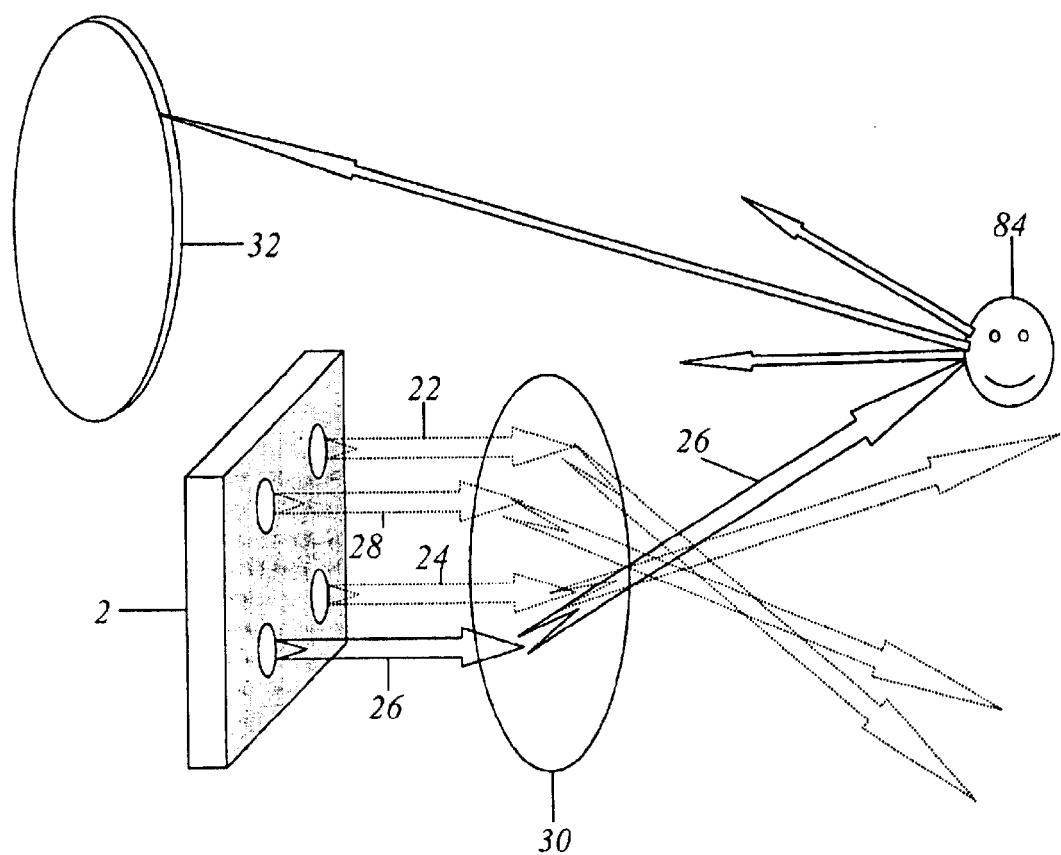
FIG. 9 illustrates how a lens can be used to spread light signals emitted by a vertical cavity surface emitting laser structure into an environment occupied by a target, wherein an emitted signal reflects off of the target and reaches the detector.

If optics are added, as depicted in FIG. 9, light signals can be steered into different angles. Light signals are shown passing through lens 30, positioned between VCSEL structure 2 and target 84. Lens 30 then redirects the light signals to different places in the environment, allowing a single detector 32 to sense targets 84 at widely separated locations. With only ten VCSEL elements, approximately, a full half-plane of $2\pi$ steradians could be monitored.

In this example, light signals 28, 22, and then 24 have already been sequentially emitted, as denoted by the dotted lines, and light signal 26 is currently lit. After being redirected by lens 30, light signal 26 travels until it intercepts target 84. Light signal 26 then reflects off of target 84 and reaches detector 32. It should be noted that target 84 happened to be positioned in the environment such that it lay in the path of light signal 26, rather than light signal 26 specifically seeking target 84. If target 84 were moved, it would lie in the path of a different light signal.

With linear arrays, position of a target along an axis can be detected. One example of a "circular" array application could use a single lens above VCSEL structure 2. This lens could skew each signal into a different angle as the individual elements are sequentially illuminated. A light signal can, therefore, be directed to different areas in an environment at different times by simply illuminating different elements at different times. Measuring the temporal output of a detector disposed to collect reflected light signals can provide information on the presence of a target and of its location. Even if location information is not necessary, the effective scanning of a light signal without moving parts can provide for a purely electrical function rather than a mechanical function. This feature allows for operation at a much lower input power, which could be important in battery-powered applications where energy conservation is often critical.

A lens or array of lenses can be positioned near VCSEL structure 2 such that a lens collimates each light signal passing through. Whereas current optical systems are generally known to collimate a single light signal into one parallel group of signals, the present invention can collimate each of a plurality of signals into corresponding parallel groups. Since each light signal passes through a lens at a different angle, due to the different location of each emission aperture on VCSEL structure 2, each group of collimated signals exits a lens at a different angle.

An aspect of the present invention includes a multiple laser optical sensing system for detecting and identifying object characteristics using a vertical cavity surface emitting laser. More particularly, the present system can be used as an optical badge reader capable of identifying distinguishing characteristics defined within similarly shaped objects such as an employee badge. As known in the art, badge readers are used to identify whether characteristics of a badge, such as RF (radio frequency) signal emissions or physical characteristics, match known or authorized criteria. Criteria can be obtained from an automated system from storage in a database or memory, in the case of RF systems, or can be determined physically through observations by a person (e.g., guard). Physical characteristics of an object such as a badge can also be determined optically using the system and methods taught herein. For example, personnel identification cards, such as badge readers, can contain a small piece of exposed film or diffraction grating that is unique and assigned to an individual. Another medium that can be easily incorporated into a badge are holographic images. Upon inserting the badge into or locating near a badge reader, the reader can not only grant access to the individual, but also be able to identify to whom it granted access.

Figure 10:
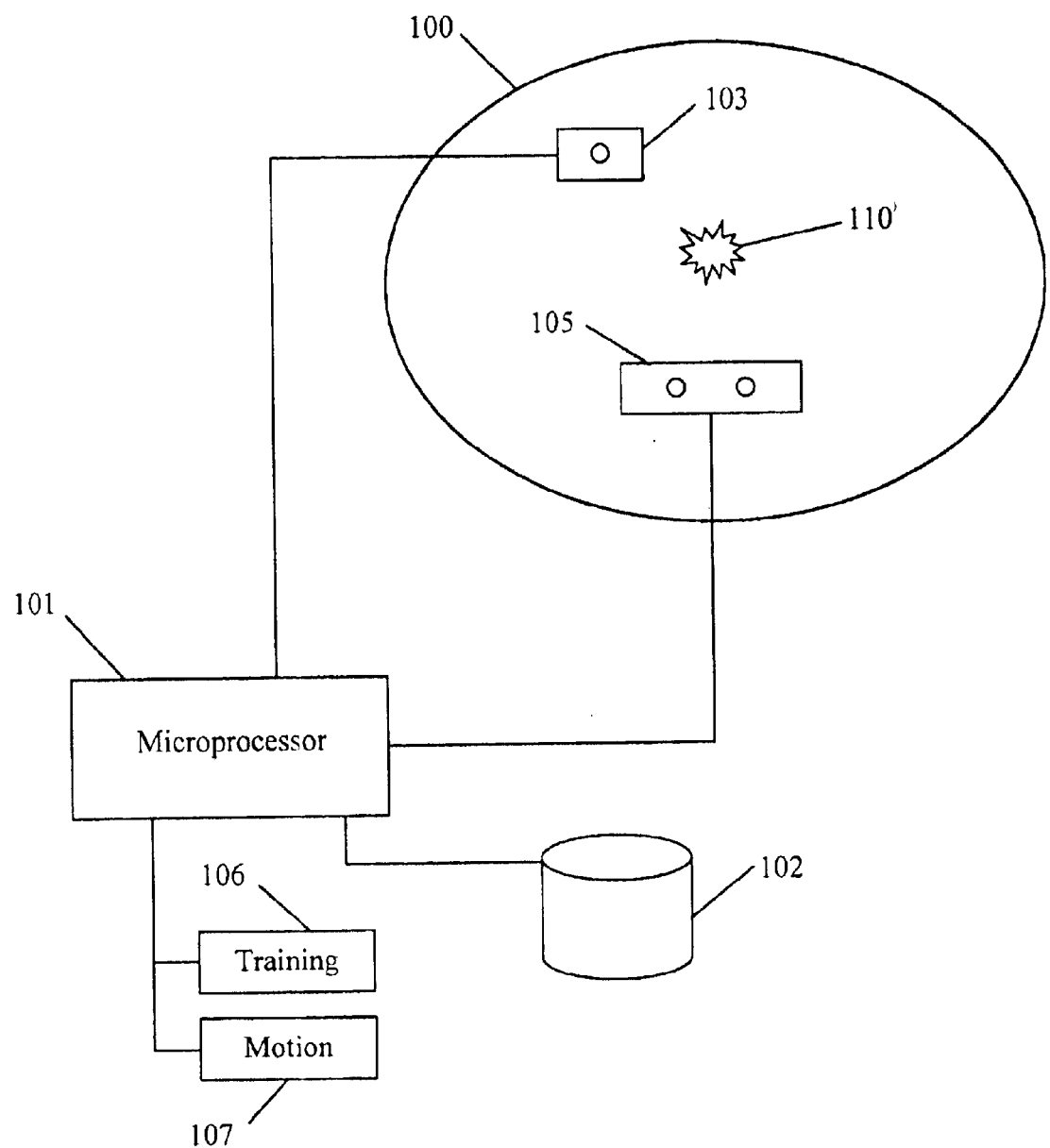
FIG. 10 illustrates a system for the present invention.

Referring to FIG. 10, an object identification system can include a vertical cavity surface emitting laser structure 105 with at least two emission apertures that could be defined by known processing methods such as photolithography. A laser signal can be emitted into a controlled environment 100 from each of the emission apertures. A controlled environment can be, for example, an imaging area located within a housing or within a limited imaging range of the object identification system. The system can also include at least one detector 103 that is operationally responsive to the vertical cavity surface emitting laser structure 105. The system can include a microprocessor 101 that is operationally coupled to the detector(s) 103, VCSEL 105 and a memory 102, such as a database, for storing target data and a training module for allowing the system to be trained to recognize targets 110. The trainable laser optical sensing system can make positive identification of object once trained where microprocessor 101 references a database 102 or using neural network capabilities to correlate the detected pattern of light signals from the target 110 with stored patterns of signals from known targets. The trainable laser optical sensing system may also include a training module 106. The training module 106 would include software used by the microprocessor 101 during training and detection operations. A motion module 107 can also be included to assist the microprocessor with moving target acquisition functions. In should be known in the art that optics can also be added to the system, such that laser signals pass through at least one lens or reflect off of a mirror or mirrors after exiting the emission apertures.

Figure 11:
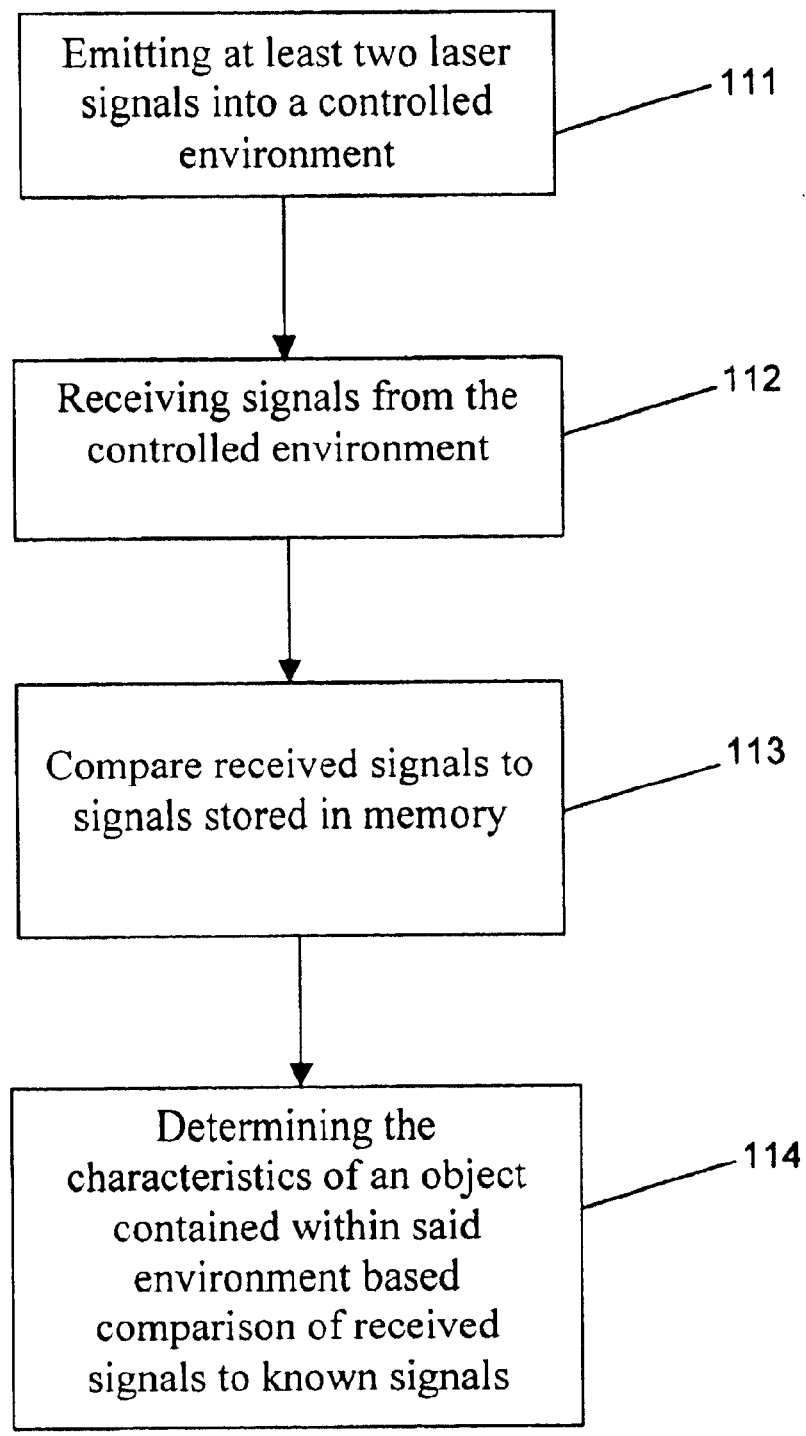
FIG. 11 illustrates a flow chart of a method for the present invention.

Referring to FIG. 11, during operation the vertical cavity surface emitting laser structure can emit at least two laser signals into the environment 111, which may be occupied by a target. At least one detector detects the presence of (receives) the laser signals 112 once they have passed through the environment. The microprocessor compares 113 received signals with known target characteristics/data stored in memory. The microprocessor then determines the target identity/characteristics 114 based on matching or substantial correlation of laser signals received by the detector(s) with known target characteristic data stored in memory. Within the same vertical cavity surface emitting laser structure, the laser signals emitted can be identical or not identical.

The system can be trained by emitting at least one laser signal at a time into an environment containing a known target, or known target characteristics, using a vertical cavity surface emitting laser structure. The known target can be referred to as a test target. The test target interferes with laser signals. Signal reflected off of said test target are received by at least one detector. The laser signals, representing target characteristics, are stored in memory.

It should be noted that nearly all of the aforementioned applications, as well as any others, could potentially be addressed using either transmissive or reflective systems. The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. An object detection and identification system, comprising:

a laser source with at least two emission apertures, wherein said laser source emits at least two laser signals into an environment;

at least one detector operationally responsive to at least one reflected laser signal, said at least one reflected laser signal receivable by said at least one detector after emission of said at least two laser signals from said laser source into and passing through said environment; and a microprocessor operationally coupled to said at least one detector and having access to memory containing data associated with said environment and object characteristic data, wherein said microprocessor analyzes said at least one reflected laser signal received by said at least one detector to determine the x, y, and z presence and at least one characteristic of objects entering said environment, said at least one characteristic including at least one of an object's size, shape, orientation, speed and reflectance.

2. The system of claim 1, wherein said laser source is a monolithic vertical cavity surface emitting laser array.

3. The system of claim 1, wherein said detector is a photodiode.

4. The system of claim 1 further comprising a memory for providing said system with storage of and access to environment and known object characteristic data.

5. The system of claim 4 including a database wherein characteristics of objects entering said environment are determined by said system based on comparison of said at least one reflected laser signal received by said at least one detector with said known object characteristic data stored in a database.

6. The system of claim 5, wherein said laser source is a vertical cavity surface emitting laser.

7. The system of claim 5, wherein said detector is a photodiode.

8. The system of claim 1 further comprising a database storing reference characteristics of known objects and for providing access to said reference characteristics of known objects to said microprocessor.

9. The system of claim 8 wherein said laser source emits said at least two laser signals into said environment occupied by at least one object, said at least one detector detects said at least one reflected laser signal after said at least two laser signals pass through said environment and said microprocessor determines object characteristics based on comparison of said signals received by said detector with said known object characteristic data stored in said database.

10. The system of claim 9, wherein said laser source is a vertical cavity surface emitting laser.

11. The system of claim 9, wherein said detector is a photodiode.

12. A method for detecting the presence and characteristics of an object entering into and occupying part of a controlled environment using an object detection system, said method comprising the steps of:

sequentially emitting at least two laser signals into said controlled environment using a vertical cavity surface emitting laser structure;

receiving laser signals reflected from at least one object that may be within said controlled environment using at least one detector; and determining the x, y and z presence of said at least one object in said controlled environment and further determining at least one characteristic of said at least one object, wherein at least one object is present and identifiable where said laser signals reflected by said at least one object are compared to at least one known object characteristics stored in a memory, said at least one known object characteristic including at least one of an object's size, shape, orientation, speed and reflectance.

13. A method for detecting the x, y, z presence of and determining the characteristics of an object in an environment, comprising the steps of:
  a) training a laser optic object detection system with the characteristics of an environment by:
    emitting a first laser signal into a controlled environment using a vertical cavity surface emitting laser structure;
    receiving, by at least one detector, a first reflected laser signal reflected off of environmental characteristics representing said environment;
    storing said first reflected laser signal in memory, wherein said first reflected laser signal represents said environmental characteristics;
  b) training said laser optic object detection system with the characteristics of at least one test object by:
    emitting a second laser signal into said controlled environment using said vertical cavity surface emitting laser structure, wherein said at least one test object reflects a second reflected laser signal;
    receiving, by said at least one detector, said second reflected laser signal, said second reflected laser signal representing at least one object characteristic; and
    storing said at least one object characteristic in said memory; and
  c) detecting the presence of at least one object in said controlled environment by:
    emitting a third laser signal into said controlled environment wherein an object interferes with said third laser signal and thereby reflects a third reflected laser signal defining the x, y and z location of said target;
    receiving, by at least one detector, said third reflected laser signal; and
    determining with a microprocessor the characteristics of said at least one object in said controlled environment by comparing said third reflected laser signal to said at least one object characteristic including at least one of an object's size, shape, orientation, speed and reflectance.

14. The method of claim 13, wherein characteristics of said at least one object are determined by analyzing a plurality of third reflected laser signals received by said at least one detector after different sequences of said plurality of third reflected laser signals are emitted by said vertical cavity surface emitting laser structure as a plurality of third laser signals.

15. The method of claim 13, wherein angular or spatial location of said at least one object are determined by comparing over time absence of a specific said object by comparing sequences of said laser signals emitted with the sequences of said laser signals previously received by said detector.

16. The method of claim 13, wherein the presence or absence of a specific object is determined by comparing the sequences of said laser signals emitted with the array of said laser signals received by said detector.

* * * * *